United States Patent [19]
Geier

[11] Patent Number: 5,620,124
[45] Date of Patent: Apr. 15, 1997

[54] ATTACHMENT METHOD OF LOAD BAG IN PICKUP TRUCK

[76] Inventor: William F. Geier, 595 Ocran Rd., Whitestone, Va. 22578

[21] Appl. No.: 641,886

[22] Filed: May 2, 1996

[51] Int. Cl.⁶ .................................................. B60R 9/055
[52] U.S. Cl. .......................... 224/404; 224/539; 224/563; 296/37.6
[58] Field of Search ....................... 224/400, 401, 224/402, 403, 404, 42.11, 539, 543, 563, 572; 296/37.1, 37.6, 100

[56] References Cited

U.S. PATENT DOCUMENTS

| | | | |
|---|---|---|---|
| 5,094,375 | 3/1992 | Wright | 224/404 |
| 5,152,574 | 10/1992 | Tucker | 296/100 |
| 5,261,719 | 11/1993 | Tucker | 296/100 |
| 5,366,124 | 11/1994 | Dearborn, IV . | |
| 5,368,210 | 11/1994 | Wotring | 224/563 |

Primary Examiner—Henry J. Recla
Assistant Examiner—Gregory M. Vidovich
Attorney, Agent, or Firm—Albert C. Pollard

[57] ABSTRACT

A method of attaching a load carrying bag inside the body of a pickup truck. The method requires first installing a tonneau cover which utilizes a rail with snaps, the rail is attached to the top edge of the truck body walls. The load carrying bags are equipped with straps extending upward from the back of the bag. The bag is place in the body of the truck body and the straps are extended over the side walls of the truck body. Snaps on the end of the straps are engaged with snaps added to the rail.

1 Claim, 2 Drawing Sheets

ATTACHMENT METHOD OF LOAD BAG IN PICKUP TRUCK

FIELD OF INVENTION

The present invention relates to attachment of collapsible load carrying bags inside the body of a pickup truck through the use of fasteners which are also used for attachment of a tonneau cover.

RELATED ART

The present invention combines two separate arts, pickup truck covers and load bags. Load covers for pickup trucks are common. One popular load cover with which this invention is associate is the tonneau cover. A tonneau cover for a pickup truck bed is a flexible material stretched over the body of the pickup truck. The edges of the cover are held by fasteners in a rail attached to the top edge of the walls of the body of the truck. This rail is one element of the invention. U.S. Pat. No. 5,152,574 to Tucker discloses one such rail which is particularly relevant to the present invention. In the disclosure of this patent the inventor describes a rail equipped with snaps for fastening a tonneau cover. In a related patent, U.S. Pat. No. 5,261,719, Tucker describes cargo support members attached to this rail by means of screws. Tucker's use of screws in U.S. Pat. No. 5,261,719 teaches away from the use of the snaps described in U.S. Pat. No. 5,152,574 as a means of supporting a load. Indeed, Tucker does not suggest or teach that his snaps may serve any other purpose than fastening a cover.

Also relevant to the present invention are containers for stabilizing a load in the bed of a pickup truck as disclosed by Dearborn in U.S. Pat. No. 5,366,124. The Dearborn patent specification suggest no other fastening means other than hook and loop fasteners on flaps which extend over the side walls of the truck body which are for the sole purpose of securing the load stabilizing containers. The flaps of the Dearborn device would interfere with installation of a Tonneau cover disclosed in the Tucker Patent.

While both of the above referenced patents have merit, they fail to recognize the full utility of the snaps disclosed by Tucker. As the reader will see, the improved load carrying bag of the present invention takes advantage of the snaps disclosed by Tucker for the attachment of a load carrying bag. Other objects and advantages will become apparent to the reader.

SUMMARY OF INVENTION

The present invention is a load carrying bag for use in pickup trucks that also have been fitted with a tonneau cover. The load carrying bag is fitted with straps that extend over the side walls of the truck body and attach to fasteners of a rails, the fasteners being the same fastening means that secure a tonneau cover. The attachment of the load carrying bag does not interfere with installation of the tonneau cover.

DESCRIPTION OF INVENTION

The load bag of the present invention is made of a flexible foldable material such as canvas. Its size is commensurate with the material to be stored therein, but is considerably smaller than the pickup truck body in which it is used so as to serve to separate and organize the stored items. The bag has attached a plurality of straps extending upward from a back vertical panel of the bag. The free end of the snaps, being the ends not attached to the bag are equipped with the female portion of a snap used in conjunction with the load carrying bag is a rail primarily used for attachment of a tonneau cover to the side walls of a pickup truck. This rail is fitted with the male portion of snaps which are used to fasten a tonneau cover. Additional male portion of snaps are added this rail to secure the load carrying bags of the present invention. These additional male portion of snaps are located at positions on the rail which do not interfere with the tonneau cover installation but are spaced as needed to mate with the snaps of the load carrying bag. In use, the load carrying bag is placed in the pickup truck bed body, the straps are extended over the side walls of the truck bed and are snapped into the added male portion of snaps of the rail. The straps being narrow and of a thin material, do not interfere with installation of the tonneau cover.

THE PREFERRED EMBODIMENT OF THE INVENTION

U.S. Pat. No. 5,152,574 issued to Tucker Oct. 6, 1992 is specifically incorporated into this specification by reference. For clarity, drawing reference numbers of the Tucker patent have been retained in this specification.

Figure 2:
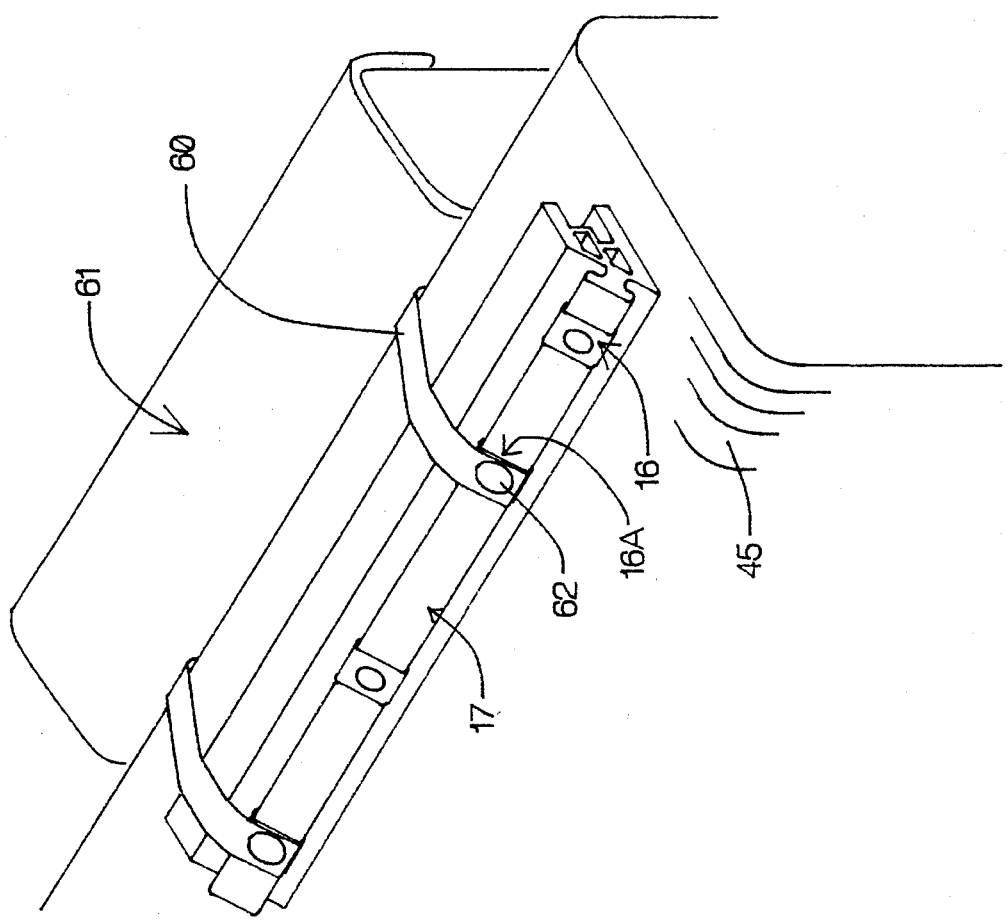
FIG. 2 illustrates the straps with snaps attached to the rail on the truck bed side wall.

Referring to FIG. 2, the Tucker patent discloses a rail 17 fitted with the male snap members 16 for the purpose of securing a tonneau cover (not shown). Additional male snap members 16A have been added to the rail to facilitate attachment of a load bag as described below.

Figure 1:
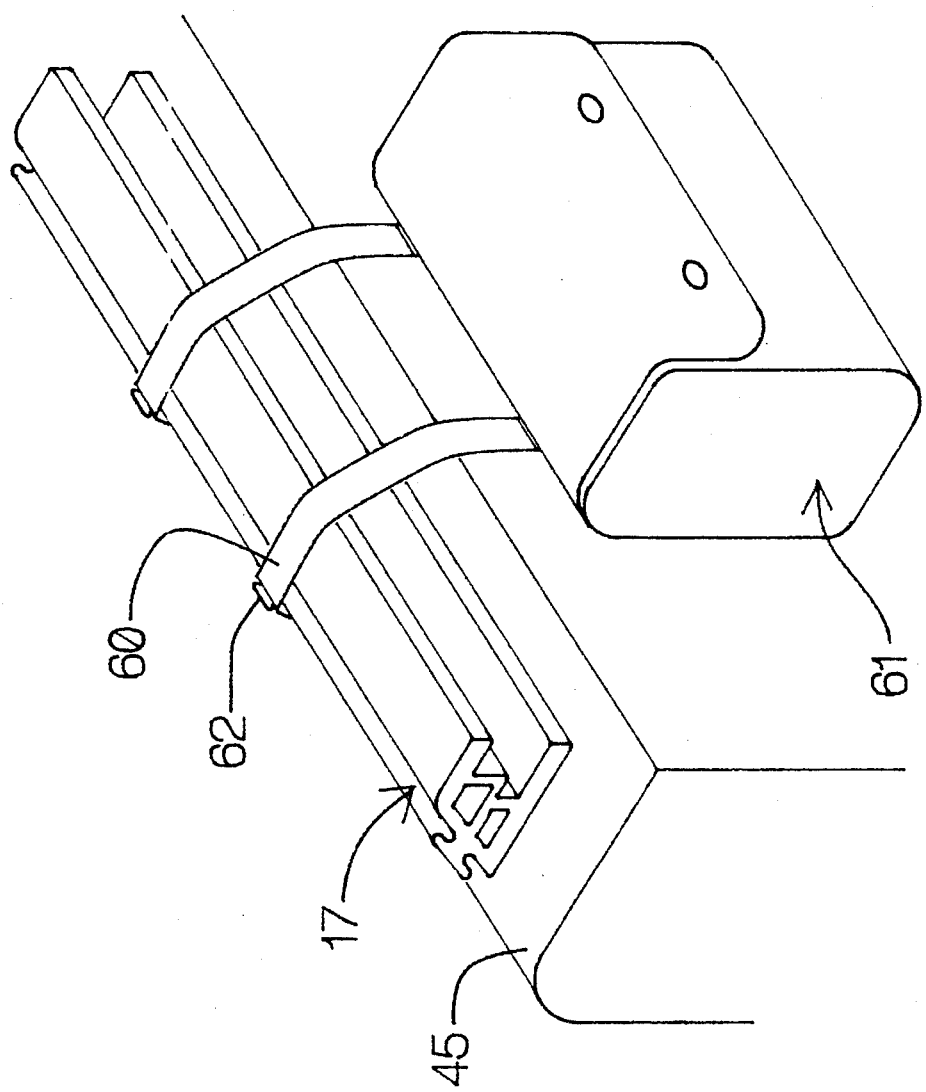
FIG. 1 illustrates the load carrying bag of the present invention.

Now referring to FIG. 1, load bag 61 is fashioned of a foldable flexible material such as canvas as illustrated. The art of making such a bag is well known by one skilled in the art of making back packs and the like, and thus the details of construction of such a bag are unnecessary. Such bags have a side or face through which its contents are accessible which will be referred to as the front of the bag. The side of the bag opposite the front will be referred to as the back of the bag. The back of the bag has attached to it upward extending straps 60. FIG. 2 shows these straps extending over rail 17 and attached to male snap members 16A by means of female snaps 62 affixed to the ends of said straps 60.

The method thus used to support a load bag of this invention is first to install a load cover rail system as described in U.S. Pat. No. 5,152,574 onto the outer wall 45 of a pickup truck, then to remove the flaccid load cover of the load cover system, then to install additional male snap members 16A in positions that do not interfere with the previously installed male snap members 16 which are used to secure the load cover. The next step is to place a load carrying bag which is fitted with straps 60 and female snaps 62 in the bed of the truck and extend said straps over the rail 17 and fasten the female snaps 62 into the male snap members 16A.

The foregoing description is but one embodiment of the invention. For example the bag disclosed is illustrated on the left side wall of the truck body. In a similar fashion a bag could be installed over the front wall of the truck body, immediately behind the cab. Thus the scope of this invention should be determined by the following claims and their legal equivalents and not merely by the example given above.

I claim:

1. A method of securing a load bag within the body of a pickup truck, said method comprising:

installing a tonneau cover assembly on the side walls of the pickup truck body, said tonneau cover assembly being of the type having a flaccid cover and having rails equipped with male snaps wherein said rails are respectively installed on top of said side walls of said pickup truck body and wherein said male snaps releasably engage female snaps on said flaccid cover;

removing said flaccid cover from said rails;

adding additional male snaps to said rails;

placing said load bag in said pickup truck body, said load bag being equipped with a plurality of straps extending upward from the back of said load bag and said straps being equipped with female snaps near the end of said strap being the opposite end from the end attached to said load bag;

extending said straps over one of said rails;

engaging said female snaps onto said additional male snaps.

* * * * *